United States Patent
Yamada et al.

(10) Patent No.: US 8,930,000 B2
(45) Date of Patent: Jan. 6, 2015

(54) PLANT MONITOR AND CONTROL DEVICE AND A MAINTENANCE SUPPORT METHOD THEREOF

(75) Inventors: Takahiro Yamada, Mito (JP); Yoshio Maruyama, Mito (JP); Tohru Akatsu, Hitachi (JP)

(73) Assignee: Hitachi, Ltd., Tokyo (JP)

( * ) Notice: Subject to any disclaimer, the term of this patent is extended or adjusted under 35 U.S.C. 154(b) by 530 days.

(21) Appl. No.: 13/044,790

(22) Filed: Mar. 10, 2011

(65) Prior Publication Data

US 2011/0224806 A1    Sep. 15, 2011

(30) Foreign Application Priority Data

Mar. 10, 2010   (JP) ................................. 2010-052504

(51) Int. Cl.
| | | |
|---|---|---|
| G05B 11/01 | (2006.01) | |
| G05B 13/02 | (2006.01) | |
| G05B 19/409 | (2006.01) | |

(52) U.S. Cl.
CPC .......... *G05B 13/0205* (2013.01); *G05B 19/409* (2013.01); *G05B 2219/31103* (2013.01); *G05B 2219/31104* (2013.01)
USPC ............................................ 700/17; 700/19

(58) Field of Classification Search
USPC ..................................................... 700/17, 19
See application file for complete search history.

(56) References Cited

U.S. PATENT DOCUMENTS

| 7,742,904 B2 * | 6/2010 | Healy et al. ........................ 703/7 |
| 2004/0056619 A1 | 3/2004 | Jonsson et al. |
| 2007/0055969 A1 * | 3/2007 | Yang ............................ 717/168 |

FOREIGN PATENT DOCUMENTS

| EP | 0 366 097 | 5/1990 |
| JP | 05-189001 | 7/1993 |
| JP | 07-056602 | 3/1995 |
| JP | 09-274508 | 10/1997 |
| JP | 11167413 | 6/1999 |

* cited by examiner

*Primary Examiner* — Carlos Ortiz Rodriguez
(74) *Attorney, Agent, or Firm* — Antonelli, Terry, Stout & Kraus, LLP.

(57) ABSTRACT

This invention includes a control device and a maintenance support device. The maintenance support device included in the plant monitor and control device selects temporary setting target logic element among logic elements contained in a control logic data, generates a temporary setting target logic element data, and generates a temporary setting logic element parameter data in accordance with a value of logic element parameter inputted by an operator. The control device memorizes the temporary setting target logic element data sent from the maintenance support device as the temporary setting target logic element data, and also the logic element parameter data before the temporary setting corresponding to the logic element designated by the temporary setting target logic element data among the logic element parameter data. Then, the control device renews the logic element parameter data located in the saving area with use of the temporary setting logic element parameter data sent from the maintenance support device.

16 Claims, 6 Drawing Sheets

FIG. 2B
Logic element parameter setting screen

| Logic element name: Fx | | Logic element identification number: Fx005 | |
|---|---|---|---|
| | Present value | Temporary setting value | Input value | Unit |
| X1 | 1.0 | | | |
| Y1 | 1.2 | | | |
| X2 | 2.0 | | | |
| Y2 | 2.4 | | | |
| ... | ... | | | |
| ... | ... | | | |
| X10 | 10.0 | | | |
| Y10 | 15.0 | | | |

Graph | Formal setting | Temporary setting | End

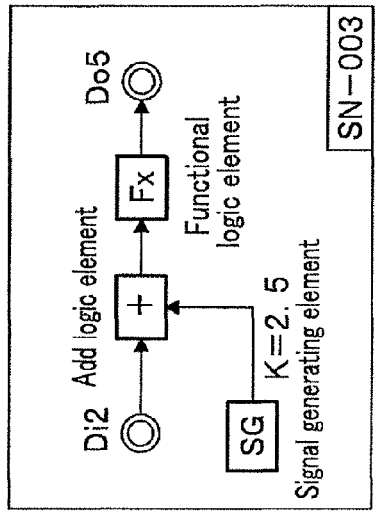

FIG. 2A
Control logic diagram display screen
(Before logic element parameter setting)

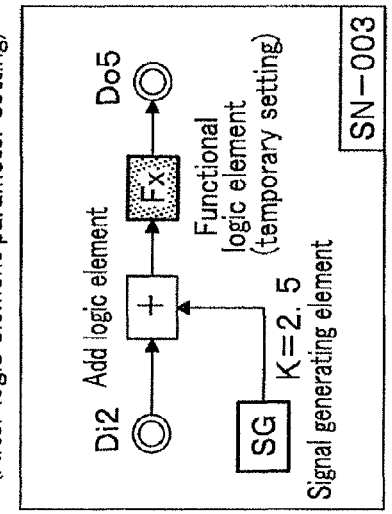

FIG. 2C
Control logic diagram display screen
(After logic element parameter setting)

FIG. 3A
Control logic data

221

| Logic element name |
| --- |
| Logic element identification number |
| Sheet number |
| Input signal name |
| Output signal name |
| ... |
| Parameter name |
| Stored parameter address |

FIG. 3B
Logic element parameter data

222

| Parameter value | X1 |
| --- | --- |
| | Y1 |
| | X2 |
| | Y2 |
| | ... |
| | ... |
| | X10 |
| | Y10 |

FIG. 3C
Temporary setting target logic element data

323

| Logic element name |
| --- |
| Logic element identification number |
| Sheet number |

FIG. 3D
Temporary setting logic element parameter data

325

| Parameter value | x1 |
| --- | --- |
| | y1 |
| | x2 |
| | y2 |
| | ... |
| | ... |
| | x10 |
| | y10 |

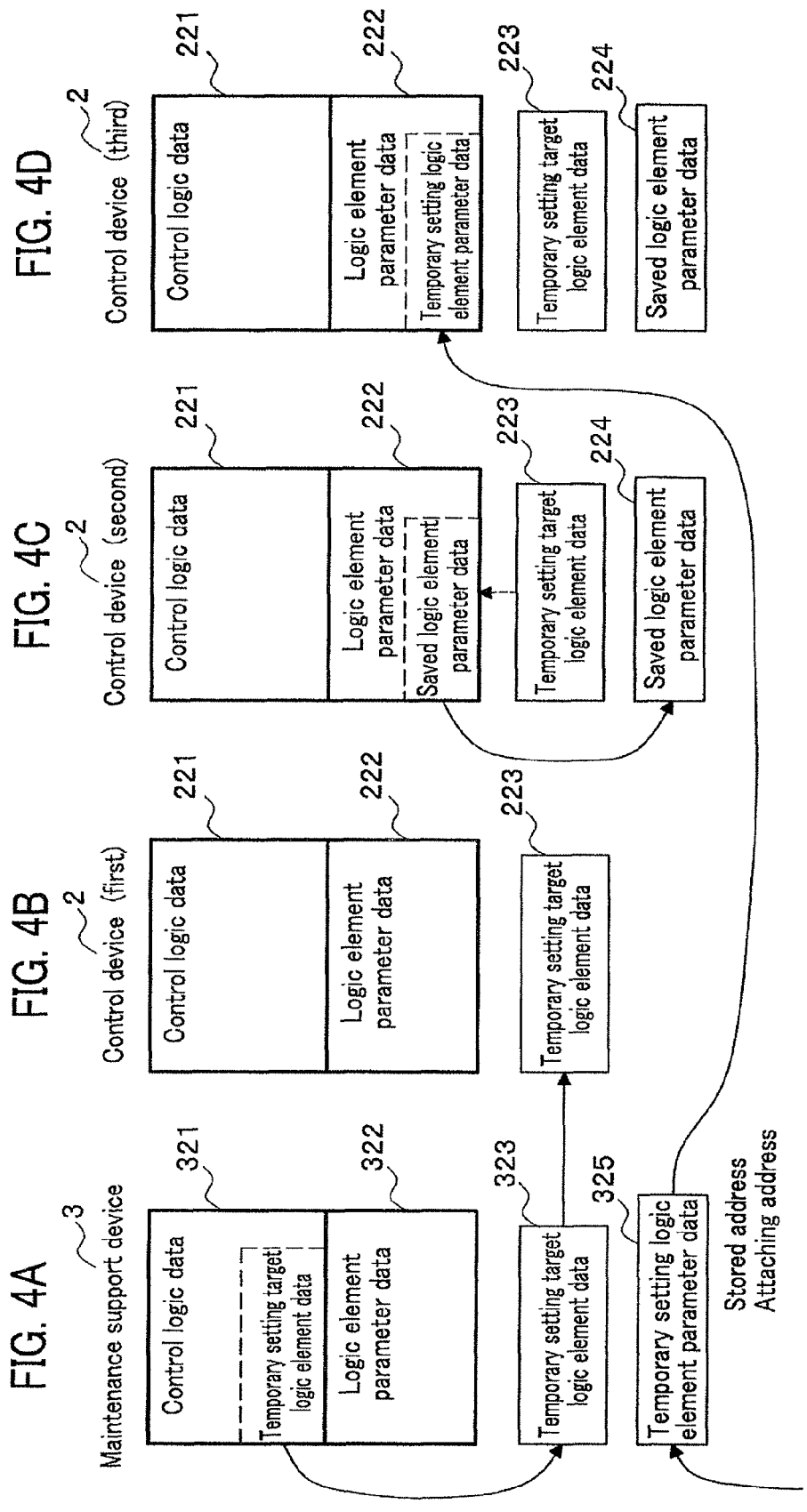

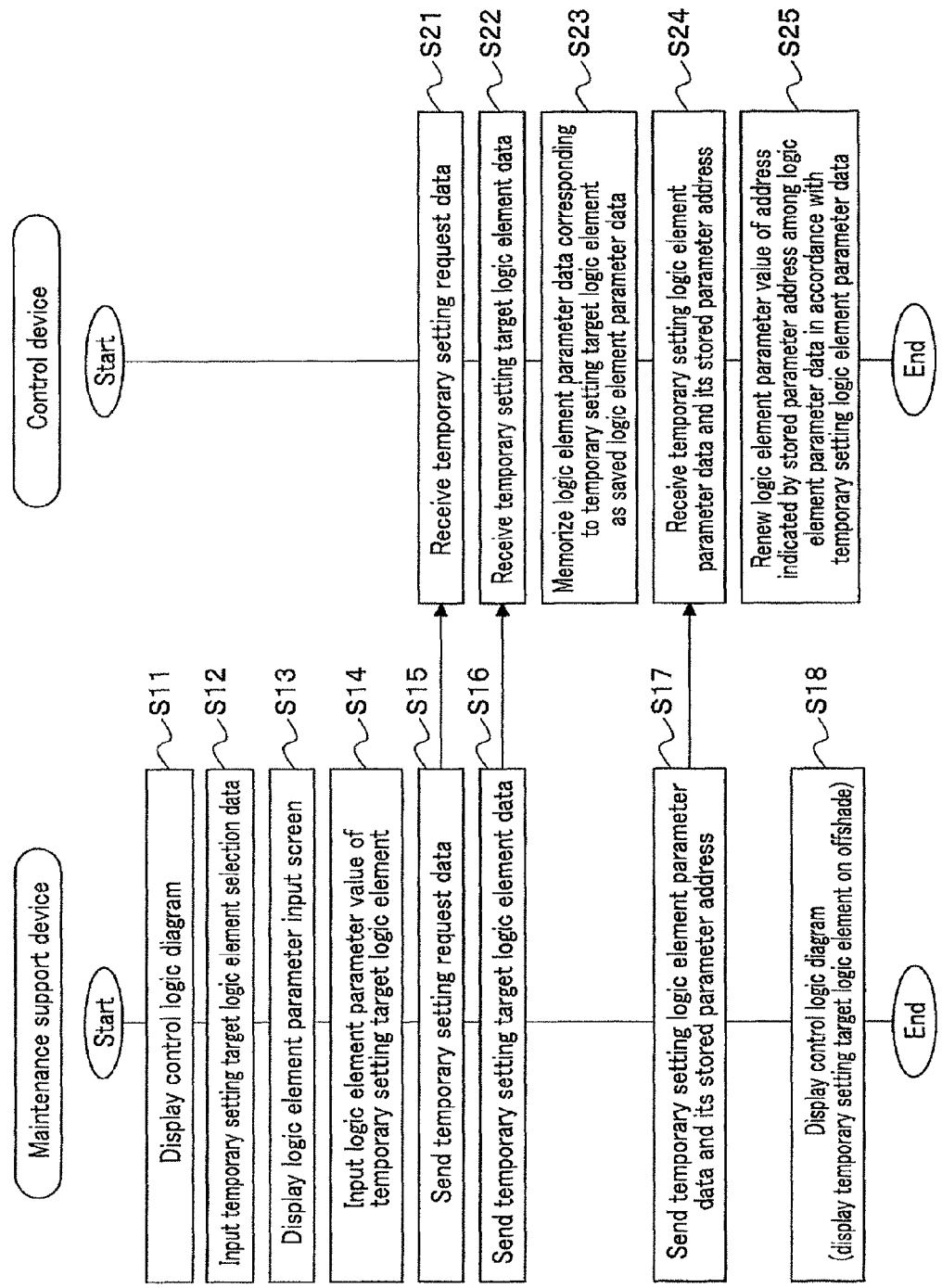
FIG. 5 (Temporary setting processing of logic element parameter)

PLANT MONITOR AND CONTROL DEVICE AND A MAINTENANCE SUPPORT METHOD THEREOF

TECHNICAL FIELD

The present invention relates to a plant monitor and control device for monitoring and controlling an operation of plant and also relates to a maintenance support method thereof.

BACKGROUND ART

In general, the plant monitor and control device used in a power plant or the like is configured to output control data of each device in order to accomplish a predetermined target (for example, constantly keeping a rotation speed of a turbine) in accordance with data indicative of the operation of each device of a plant (for example, temperature of boiler, flow rate of combustion gas, or rotation speed of a turbine) or the instruction data inputted by an operator of monitor and operation center. Then, the plant monitor and control device is configured to incorporate control logic for calculating control data outputting to each device of plant with use of input data from each device of plant and instruction data inputted by an operator. The control logic is configured to include various logic elements.

Some of predetermined parameters such as Proportional-Integral element and folded logic element among logic elements must be defined to determine an action of the element. Such logic element is often used in the control logic of the plant monitor and control device. Furthermore, a value of such parameter might be affected to output of control logic (control data). Then, an offset operation is performed to actually operate a plant and to adapt the parameter to a real value. This operation is called as a parameter tuning.

In this specification, setting a value of parameter used temporarily in the parameter tuning is called as "temporary setting". Also, setting a value of parameter used permanently in actual work of plant is called as "formal setting". Thus, a value of parameter used as "formal setting" is used as an optimal value obtained from a repetition of "temporary setting" of the parameter and test operation of plant.

In Japanese Patent Unexamined Laid-open Publication No. 167,413 of Heisei 11 (hereinafter, it is referred to as Reference 1), an example of parameter tuning in the control logic of the plant monitor and control device, in particular, an operational screen and processing steps in a computer (maintenance support device) supporting the tuning is disclosed.

However, as the temporary setting and formal setting of parameter are not distinguished each other in the Reference 1, there exists the following problems.

A figure of the control logic is displayed in an operational screen of support tool described in the Reference 1, and a parameter set in the logic element is displayed near the logic element as a target of the parameter tuning shown in the display screen. A test personnel of parameter tuning is likely to understand whether the displayed parameter is set by the formal setting or by the temporary setting.

In this case, when the test personnel of the parameter tuning selects logic element, troublesome works for judging whether the parameter is set by the formal setting or by the temporary setting are required by showing a parameter setting display of the logic element, so that the test personnel of the parameter tuning confirms whether the parameter of the logic element is set by the formal setting or by the temporary setting.

In case where the parameter tuning is performed by the temporary setting at a computer of the maintenance support device, which has been ordinarily used, a parameter obtained by the temporary setting is memorized in a memory device of the control device, and a parameter prior to be obtained is memorized in a computer of the maintenance support device. A temporary setting parameter memorized in the control device can be constantly reset with use of a parameter prior to temporary setting memorized in a computer of the maintenance support device. However, in case where the temporary setting parameter is reset by operational errors of the test personnel because of a function to reset in an original condition, it is a problem that the temporary setting parameter is likely to be disappeared.

As above mentioned, in case where a conventional plant monitor and control device perform the parameter tuning of the control logic, sufficient care for improving a work efficiency has not been taken. As a result, the work efficiency of the parameter tuning cannot be sufficiently improved.

An object of the present invention is to provide a plant monitor and control device capable for improving work efficiency of the parameter tuning.

The plant monitor and control device relating to the present invention is constituted by a control device and a maintenance support device. The logic element parameter data of the logic element contained in the control logic data for calculating control data outputting to an actuator of plant and the logic element parameter data of the logic element contained in the control logic data are memorized in the memory device of the control device. The control device performs an arithmetic processing in accordance with the control logic data to output the control data to a plant. The maintenance support device supports the parameter tuning of the control device by performing the temporary setting of the logic element parameter data memorized in the memory device of the control device.

In case where the control device receives a temporary setting request data seeking for the temporary setting of the logic element parameter data from the maintenance support device, it is characterized (1) to receive the temporary setting target logic element data sent from the maintenance support device to memorize in the memory device, (2) to save in the logic element parameter data corresponding to the logic element designated by the temporary setting target logic element data among the logic element parameter data memorized in the memory device, and (3) to receive the temporary setting logic element parameter data sent from the maintenance support device and renew the logic element parameter data memorized in the memory device by the temporary setting logic element parameter data.

As the temporary setting target logic element data is memorized in the memory device of the control device in the plant monitor and control device relating to the present invention, the temporary setting target logic element can be distinguished from the other logic element. Accordingly, the temporary setting target logic element can be distinguishably displayed to distinguish from, the other logic element. It can be memorized as a backup data of the logic element parameter data after the temporary setting corresponding to the logic element designated by the temporary setting target logic element data.

A work efficiency of the parameter tuning in the plant monitor and control device can be remarkably improved according to the present invention.

BRIEF DESCRIPTION OF DRAWINGS

FIG. 2 is a view showing an example of screen displayed in the display device of the maintenance support device. FIG. 2A is an example of the control logic diagram display screen before the logic element parameter setting, FIG. 2B is an example of the logic element parameter setting display, and FIG. 2C is an example of control logic diagram display screen after logic element parameter setting.

FIG. 3 is a view showing a constitutional example of the control logic data and the logic element parameter data memorized in the memory device of the control device, and a view showing a constitutional example of the temporary setting target logic element data and the temporary setting logic element parameter data designated by the maintenance support device.

FIG. 4 is a view showing a data flow in case of temporary setting of logic element parameter.

FIG. 5 is a view showing an example of processing flow of the temporary setting of the logic element parameter.

EMBODIMENT FOR CARRYING OUT THE INVENTION

Hereinafter, an embodiment of the present invention will be described in detail with reference to drawings.

Figure 1:
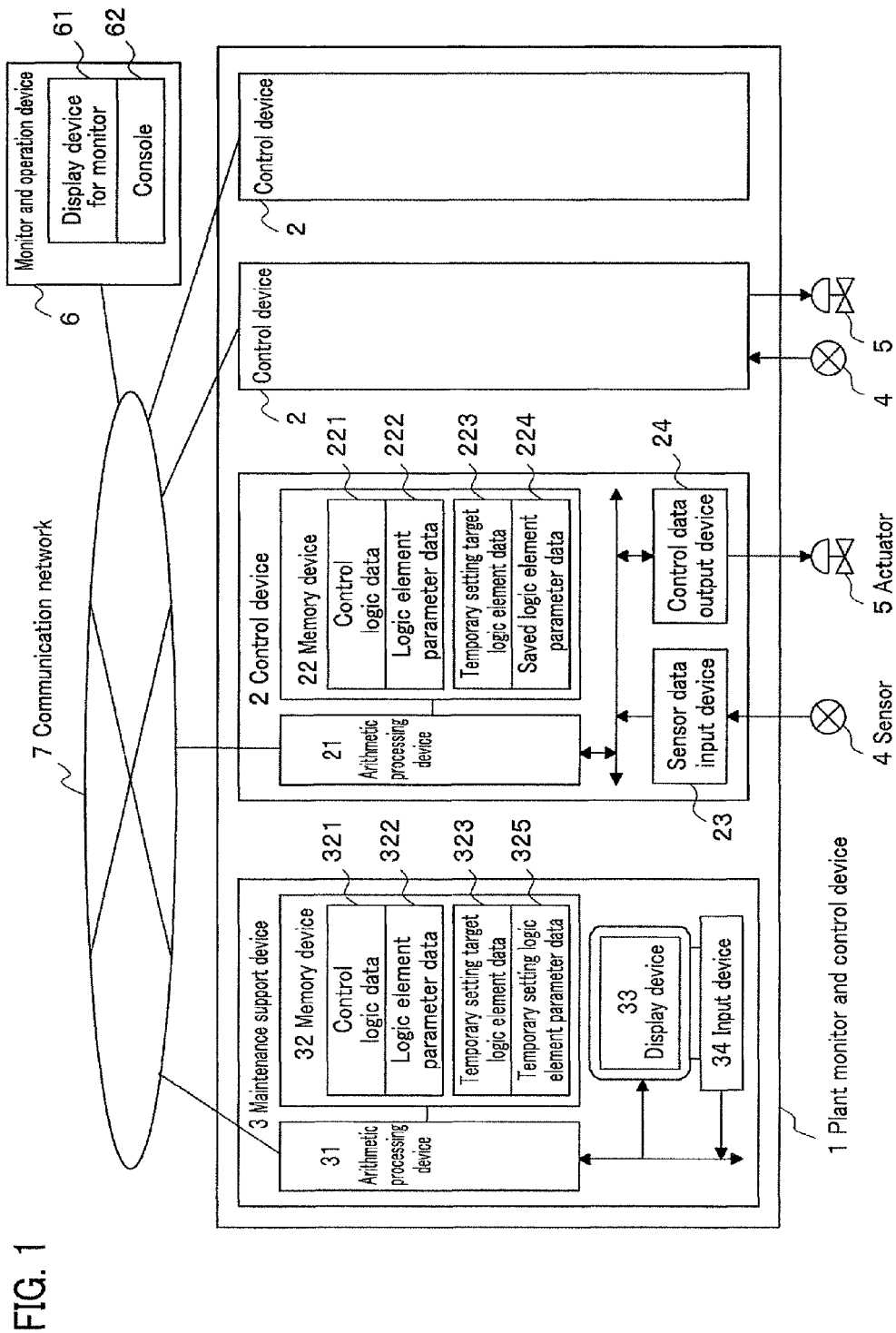
FIG. 1 is a view showing a constitutional example of the plant monitor and control device relating to an embodiment of the present invention.

FIG. 1 is a view showing a constitutional example of the plant monitor and control device relating to an embodiment of the present invention.

As shown in FIG. 1, the plant monitor and control device 1 relating to an embodiment of the present invention is mutually connected to communicate through a communication network 7 between one or more control devices 2 and a maintenance support device 3. The control device 2 is configured by a computer having an arithmetic processing device 21 and the memory device 22 as commonly used, PLC (Programmable Logic Controller) or the like to include a sensor data input device 23 and a control data output device 24.

A sensor data input device 23 is connected to various sensors 4 (for example, boiler thermometer or flowmeter of combustion gas) provided in a plant to obtain data indicative of operation condition of a plant (for example, boiler temperature or flowmeter of combustion gas) from the sensor 4. The control data output device 24 is connected to various actuators 5 (for example, motor for regulating a degree of valve opening of combustion gas piping) provided in a plant to output control data (for example, valve opening degree data of combustion gas piping) for controlling the drive.

The control device 2 is further connected to a monitor and operation device 6 provided in a central management room or the like through the communication network 7. The monitor and operation device 6 is constituted to comprise a display device for monitor 61 and a console 62. The display device for monitor 61 is constituted by a large-scale display device embedded in a wall or the like and a display device typed of console. This console 62 is constituted by a dedicated switching board or common keyboard. An operator for monitor can input various indicative data to the control device 2 through the console 62, and the indicative data as inputted is sent through the communication network 7 to the control device 2.

A control logic data 221 and a logic element parameter data 222 are memorized in the memory device 22 of the control device 2. The control logic data 221 is data for representing control logic calculating control data to be outputted to the actuator 5 as a control logic diagram in accordance with sensor data inputted from the sensor data input device 23 and an instruction data sent from the monitor and operation device 6. The arithmetic processing device 21 calculates the control data by implementing the program after converting the control logic data 221 into executable program, thus to output to the control data output device 24.

The control logic diagram represented by the control logic data 221 comprises various logic element. Some of the logic elements such as Proportional-Integral element or Folded line element are required for a value of parameter determining the performance characteristics. The logic element parameter data 222 is data for determining a value of parameters concerning each of such logic elements. Although a value of such parameters is commonly determined in accordance with designer's experience or its simulation when the control logic diagram represented by the control logic data 221 is designed, the parameter tuning is performed if necessary.

Although the temporary setting target logic element data 223 and the saved logic element parameter data 224 required for the parameter tuning are memorized in the memory device 22, its detail will be described in the following.

The maintenance support device 3 is used for a design of the control logic data 221 or logic element parameter data 222 of the control device 2, the parameter tuning of the control device 2, or the like, and is constituted by a computer, as commonly used, having an arithmetic processing device 31, the memory device 32, the display device 33, the input device 34, or the like. The display device 33 is a liquid crystal display typed of console as commonly used, or the input device 34 is a keyboard, a mouse, or the like as commonly used.

The maintenance support device 3 can load the control logic data 321 and the logic element parameter data 322 memorized in the memory device 32 to the control logic data 221 and the logic element parameter data 222 memorized in the memory device 22 of the control device 2. In case where a plurality of control devices 2 are included in the plant monitor and control device 1, the control logic data 321 and the logic element parameter data 322 corresponding to each of the control devices 2 are memorized as classified by each control device 2 in the memory device 32. An explanation for distinguishing from the control device 2 will be omitted in this specification in order to avoid a repetition of explanation.

The temporary setting target logic element data 323 is data for distinguishing the temporary setting target logic element selected from logic elements containing the control logic data 321 by the test personnel at the time of parameter tuning. The temporary setting logic element data 325 is data for memorizing a value of parameter temporarily set as inputted by the test personnel, in the selected temporary setting target logic element. The selection of these temporary setting target logic elements and the input of the temporary setting logic element parameter are performed through the display screen 33 and the input device 34.

In the memory device 32, although the temporary setting target logic element 323 and the temporary setting logic element parameter data 225 used as a memory area of the input data at the time of parameter tuning are memorized, the detail will be later described.

FIG. 2 is a figure showing an example of display screen shown in the display device 33 of the maintenance support device 3. FIG. 2A is an example of control logic diagram display screen prior to setting logic element parameter. FIG. 2B is an example of logic element parameter setting display, and FIG. 2C is an example of control logic diagram display screen after logic element parameter setting. When the test personnel performs the parameter tuning, the maintenance support device 3 displays the control logic diagram in the display device 33 in accordance with a predetermined instruction data inputted from the input device 34, as shown in FIG. 2A.

In FIG. 2A, a double circle represents input or output terminal to the outside, a square represents logic element, and an arrow represents a moving direction of data or signals. In an example of FIG. 2A, a functional logic element (Fx) and a signal generation element (SG) are required to determine a value of parameter designating the performance characteristics.

An actual control logic diagram is much complicated not to be simple like FIG. 2A and represented through a plurality of drawings. In this case, the control logic diagram in one screen is likely to correspond to a sheet of drawings of conventional paper. For example, a sheet number (SN-003) of the drawing is displayed in a rectangular frame at a right and lower portion in the control logic diagram as shown in FIG. 2A.

A test personnel can select the temporary setting target logic element through the control logic diagram (FIG. 2A) displayed in the displayed device 33. In this case, the test personnel selects a functional logic element (Fx), for example, with use of mouse, cursor, or the like. Then, the maintenance support device 3 represents the logic element parameter setting screen as shown in FIG. 2B.

In FIG. 2B, "logic element name" is data representing kinds of logic element selected as the temporary setting target logic element, and "logic element identification number" is identification data for uniquely identifying the logic element among the control logic diagram. "X1, Y1, X2, Y2, . . . , X10, Y10" is a name of parameter determining performance characteristics of the logic element.

In a column of "present value" in the name of each parameter as above mentioned, a value of parameter memorized in the logic element parameter data 222 of the control device 2 is displayed concerning the logic element. In a column of "input value", a value of parameter inputted by the test personnel is displayed to designate the parameter. In a column of "temporary setting value", a value of parameter inputted in a column of the "input value" is displayed as a value of parameter of temporary setting, when a value of parameter inputted in a column of "input value" is temporarily set as a value of parameter of the logic element parameter data 222 of the control device 2.

In the logic element parameter setting display of FIG. 2B, menu buttons such as "graph", "formal setting", "temporary setting", and "end" are displayed in the right and lower portion. "temporary setting" button is a button for indicating an execution of the temporary setting procedure of the logic element parameter. For example, when a test personnel clicks a "temporary setting" button after values of each parameter is inputted in a column of "input value", the temporary setting processing of the logic element parameter as later described are respectively executed in the maintenance support device 3 and the control device 2.

Next, the maintenance support device 3 displays a value of parameter displayed in a column of "input value" of the logic element parameter setting screen as shown in FIG. 2B, when an execution of the temporary setting processing of the logic element parameter terminates.

In case where the maintenance support device 3 displays the control logic diagram after the logic element parameter is temporarily set, the temporary setting target logic element (in this case, functional logic element (Fx)) is displayed to distinguish from the other logic element (temporary setting non-target logic element), for example, by indicating on offshade, applying shading or indicating a letter "temporary setting". In case where a value of parameter (K=2.5) is displayed near the logic element like a signal generating element (SG), it distinguishes from the other logic element by indicating a value of parameter like indicating on offshade or the letter "temporary setting".

In the logic element parameter setting screen of FIG. 2B, when a "formal setting" button is clicked, the formal setting procedure of the logic element parameter as later described is executed in the maintenance support device 3 and the control device 2. In case where a "graph" button is clicked, the maintenance support device displays a graph of time course of output signal of the logic element or predetermined principal signal as obtained in the control device 2 when the control device 2 and the plant is actually worked at the logic element parameter, as temporarily set, in the display device 33.

FIG. 3 is views showing a constitutional example of the control logic data 222 and the logic element parameter data 222 memorized in the memory device 22 of the control device 2 and a constitutional example of the temporary setting target logic element data 323 and the temporary setting logic element parameter data 325 memorized in the control device 32 by setting at the maintenance support device 3.

As shown in FIG. 3A, the control logic data 221 is configured to include a logic element name, a logic element identification number, a sheet number, an input signal name, an output signal name, or the like, and is configured to include a parameter name and a stored parameter address in case where the logic element includes the logic element parameter.

The logic element name is data for representing an assortment of the logic element, and the logic element identification number is an identification data for identifying the logic element uniquely at the control logic data 221. The sheet number is a number for identifying a page of the drawing when the control logic diagram represented by the control logic data 221 is divided into a plurality of drawings.

The input signal name is a signal name of a signal inputted into the logic element to represent as an output signal name of the other logic element or a signal name of an input terminal. The output signal name is a signal name of a signal outputted from the logic element to be used as an input signal name of the other logic element or a signal name of an output terminal. A plurality of input signal names or output signal names may be set in one logic element.

The stored parameter address is data for representing an address at the memory device 22 in case where the logic element parameter is stored in the memory device 22 as a part of the logic element parameter data 222. The stored parameter address may be designed to memorize only the first address of a set of parameters in case where a plurality of logic element parameters are memorized in one set relative to a logic element.

Next, as shown in FIG. 3B, the logic element parameter data 222 is constituted only by a value of parameter of each logic element parameter.

As the control logic data 321 and the logic element parameter data 322 memorized in the memory device 32 of the maintenance support device 3 is the same in constitution as the control logic data 221 and the logic element parameter data 222 memorized in the memory device 22 of the control device 2, the configuration is as shown in FIGS. 3A and 3B.

Next, as shown in FIG. 3C, the temporary setting target logic element data 323 memorized in the memory device 32 of the maintenance support device 3 is configured to include the logic element name, the logic element identification number and the sheet number concerning the logic element selected as the temporary setting target logic element. That is, when the maintenance support device 3 extracts the logic element name, the logic element identification number, the sheet number, or the like concerning the temporary setting target logic element as selected with reference to the control logic data 321 to memorize in the memory device 32 as the temporary setting target logic element data 323, when the temporary setting target logic element is selected through the control logic display screen in FIG. 2A.

Next, as shown in FIG. 3D, the temporary setting logic element parameter data 325 memorized in the memory device 32 of the maintenance support device 3 is configured by a value of one or more logic element parameters inputted through the logic element parameter setting screen in FIG. 2B.

FIG. 4 is a view showing a data flow in case of temporarily setting the logic element parameter. FIG. 4A shows a state of data memorized in the memory device 32 of the maintenance support device 3 when the test personnel finishes the input of the temporary setting target logic element parameter. FIG. 4D shows a state of data memorized in the memory device 22 of the control device 2 when the temporary setting of the logic element parameter terminates. FIGS. 4B and 4C show a process leading to FIG. 4D, respectively.

When a test personnel performs temporary setting of the logic element parameter, the maintenance support device 3 shows the control logic diagram as shown in FIG. 2A in the display device 33. When the temporary setting target logic element is selected from the control logic diagram as shown, the maintenance support device 3 extracts data concerning the temporary setting target logic element as selected from the control logic data 321 to generate the temporary setting target logic element data 323. (circle 1 of FIG. 4) Next, the maintenance support device 3 generates the temporary setting logic element parameter data 325 in accordance with a value of the logic element parameter inputted through the logic element parameter setting screen (See FIG. 2B). (circle 2 of FIG. 4)

Next, the temporary setting target logic element data 323 is sent to the control device 2 and memorized in the memory device 22 as the temporary setting target logic element data 223. (circle 3 of FIG. 4)

Next, the control device 2 retrieves the control logic data 221 by designating the logic lement identification number of the temporary setting target logic element data 223 as a key to obtain the stored parameter address of the logic element as the logic element identification number detected and the logic element identification number accorded. The control device 2 also extracts a value of parameter of the logic element parameter data 222 stored in an address indicated by the stored parameter address, and memorize it in the memory device 22 as the saved logic element parameter data 224. (circle 4 of FIG. 4)

Next, as the maintenance support device 3 sends the data appending the stored parameter address to the temporary setting logic element parameter data 325, the control device 2 receives the temporary setting logic element parameter data 325 and the stored parameter address and renews a value of logic element parameter data of the address indicated by the stored parameter address in accordance with the temporary setting logic element parameter 325 as received. (circle 5 of FIG. 4)

As above mentioned, as the logic element parameter of the logic element selected and inputted at the maintenance support device 3 is performed as temporary setting in the logic element parameter data 222 of the control device 2, the test personnel of the parameter tuning operates the control device 2 and plant, and can perform the parameter tuning by the logic element parameter as the temporary setting performed. In case where the logic element parameter as above mentioned is performed as temporary setting, there are no changes in the logic element parameter data 322 memorized in the memory device 32 of the maintenance support device 3.

Accordingly, when the parameter tuning is performed, both the logic element parameter data 322 (the logic element parameter data as formal setting previously performed) as used in the control device 2 at the time of normal drive of plant and the temporary setting logic element parameter data 325 as "temporary setting" performed are memorized at the same time in the memory device 32 of the maintenance support device 3. The control device 2 memorizes a value of parameter before temporary setting of the logic element parameter data 322 (logic element parameter data as "formal setting" is previously performed) as a target of "temporary setting" of a plant as used in the control device 21 at the time of normal drive in the memory device 22 as the saved logic element parameter data 224.

Accordingly, the control unit 2 can restore the logic element parameter data 222 in a state of logic element parameter data previously designated by the "formal setting" at any time. Even in case where the logic element parameter data 222 including the logic element parameter designated by "temporary setting" memorized in the memory device 22 of the control device 2 is returned to the logic element parameter data previously and incorrectly designated by the "formal setting" caused by an operational error at the maintenance support device 3, the maintenance support device 3 memorizes the temporary setting target logic element data 323 and the temporary setting logic element parameter data 325 after the "temporary setting" in the memory device 32. Thus, the logic element parameter data 222 at the control device 2 after the "temporary setting" can be restored.

FIG. 5 is a view showing an example of processing flow of the temporary setting processing of the logic element parameter. As FIG. 5 is a view to show data flow in FIG. 4 by a processing flow, a part of the explanation is repeated by an explanation of FIG. 4.

As shown in FIG. 5, an arithmetic processing device 31 of the maintenance support device 31 (an executive body of procedure is supposed to be an arithmetic processing device 31. Hereinafter, it is referred to as merely a "maintenance support device 3".) shows a control logic diagram as shown in FIG. 2A in the display device 33 based on the control logic data 321 about the control device 2 predetermined at first (Step S11). The maintenance support device 3 inputs a temporary setting target logic element selection data as logic element data selected by a mouse cursor or the like among the control logic diagram shown therein (Step S12), and generates the temporary setting target logic element data 323.

Next, the maintenance support device 3 shows a logic element parameter setting screen as shown in FIG. 2B about a logic element designated by the above temporary setting target logic element selection data. (Step S13) The maintenance support device 3 inputs a value of logic element parameter of the temporary setting target logic element designated through the logic element parameter setting screen and the input device 34. (Step S14) and generates the temporary setting logic element parameter data 325.

Next, the maintenance support device 3 sends a temporary setting request data seeking for temporary setting of the logic element parameter to the control device 2 (Step S15), and further sends the temporary setting target logic element data 323. (Step S16) On the other hand, the arithmetic processing device 21 of the control device 2 (an executive body of procedure is supposed to be an arithmetic processing device 21. Hereinafter, it is referred to as merely a "maintenance support device 3") receives the temporary setting request data sent from the maintenance support device 3 (Step S21), and further receives the temporary setting target logic element data 323. (Step S22) Then, the temporary setting target logic element data 323 as received is memorized as the temporary setting target logic element data 223 in the memory device 22.

Next, the control device 2 extracts the logic element parameter data corresponding to the temporary setting target logic element designated at the temporary setting target logic element data 223 from the logic element parameter data 222, and memorizes the logic element parameter data as extracted in the memory device 22 as the saved logic element parameter data. (Step S23) The logic element parameter data corresponding to the temporary setting target logic element designated by the temporary setting target logic element data 223 retrieves the control logic data 221 by designating the logic element identification number of the temporary setting target logic element data 223 as a search key to obtain the stored parameter address of the logic element which is concurrent with the logic element identification number. Then, it can be obtained as a value of parameter of the logic element parameter data 222 stored in an address designated by the stored parameter address.

Next, as the maintenance support device 3 sends the temporary setting logic element parameter data 235 and the stored parameter address (Step S17), the control device 2 receives the temporary setting logic element parameter data 235 and the stored parameter address as received from the maintenance support device 3 (Step S24). The control device 2 renews a value of the logic element parameter of an address designated by the stored parameter address among the logic element parameter data 222 by the temporary setting logic element parameter data 325. (Step S25)

On the other hand, after the maintenance support device 3 terminates the temporary setting of the logic element parameter at the control device 2, if it displays a display control logic diagram (Step S18) then the temporary setting target logic element can be visually distinguished from the temporary setting non-target logic element by on offshade or the like, as shown in FIG. 2C.

Figure 6:
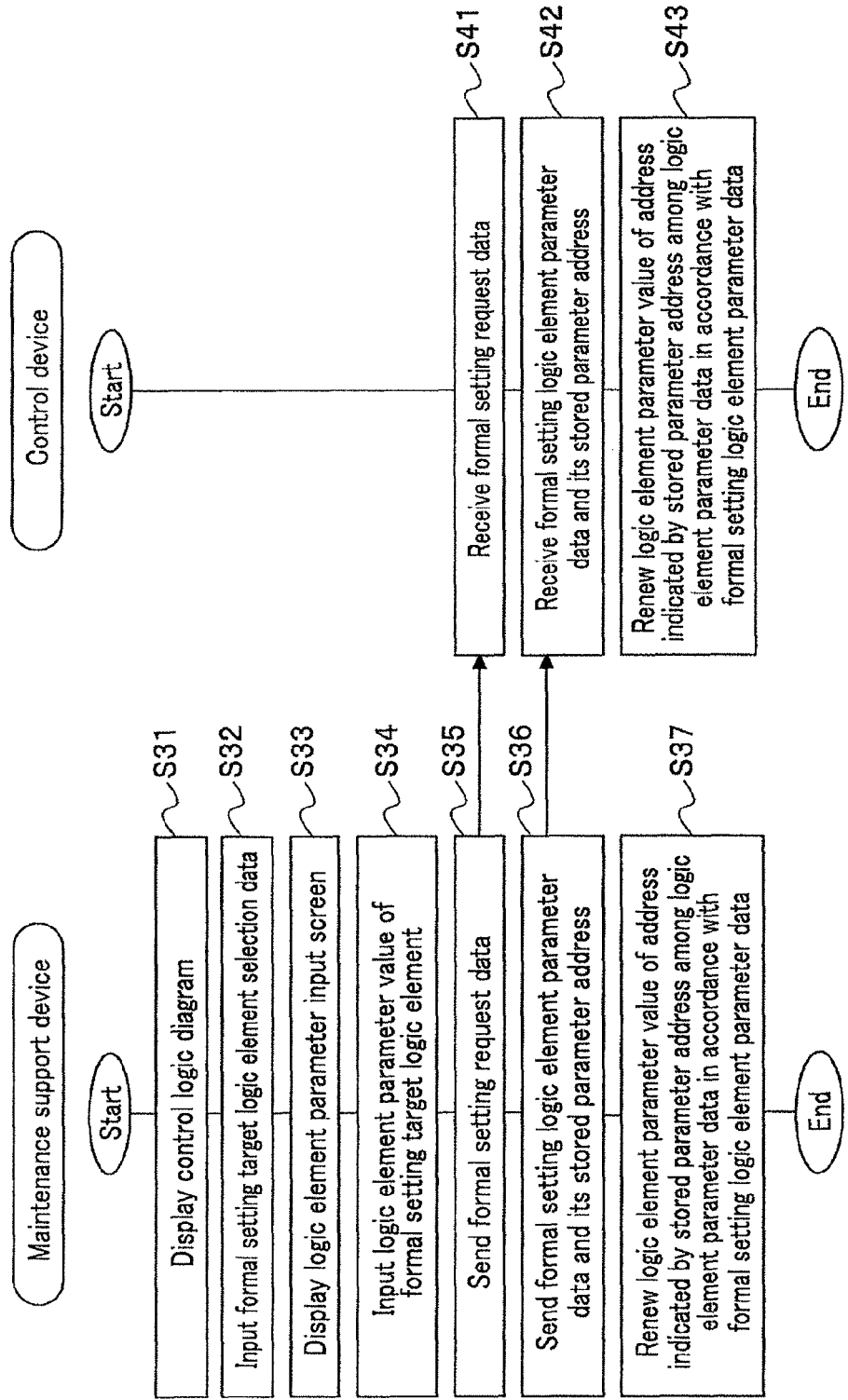
FIG. 6 is a view showing an example of processing flow of the temporary setting of the logic element parameter.

FIG. 6 is a view showing an example of processing flow of formal setting processing of the logic element parameter. As shown in FIG. 6, procedures performed from Steps S31 to S34 are substantially the same as procedures performed from Steps S11 to S14 in FIG. 5. That is, an operation performed by the test personnel at the time of formal setting of the logic element parameter is substantially the same as the operation of temporary setting. Herein, the explanation of procedures performed until Step S34 will be omitted.

As the formal setting target logic element is selected by the procedures until Step S34, a value of logic element parameter relative to the formal setting target logic element (formal setting logic element parameter data) will be a prescribed value. The maintenance support device 3 sends formal setting request data seeking for the formal setting of the logic element parameter to the control device 2 (Step S35), and further sends the formal setting logic element parameter data and its stored parameter address (Step S36). On the other hand, the control device 2 receives the formal setting request data sent from the maintenance support device 3 (Step S41), and further receives the formal setting logic element parameter data and its stored parameter address. (Step S42)

Next, the maintenance support device 3 renews a value of logic element parameter of an address designated by the stored parameter address among the logic element parameter data 322 in accordance with the formal setting logic element parameter data as received. (Step S37) The control device 2 renews a value of logic element parameter of the address designated by the stored parameter address among the logic element parameter data 222 in accordance with the formal setting logic element parameter data as received. (Step S43)

That is, the logic element parameter data 222, 322, respectively, memorized in the memory devices 22, 32 are also renewed in the same way in accordance with the formal setting logic element parameter data designated through the maintenance support device 3 not only in the memory device 2 but also in the maintenance support device 3. Accordingly, even after the maintenance support device 3 performs the formal setting of the logic element parameter data, it has the same logic element parameter data 322 as the logic element parameter data 222 of the control device 2 without changing it.

There are many cases, in which the logic element parameter designated as the temporary setting is supposed to be the logic element parameter designated as the formal setting. In this case, the maintenance support device 3 replaces the logic element parameter data 322 memorized in the memory device 32 by the logic element parameter data 222 including the temporary setting logic element parameter memorized in the memory device 22 of the control device 2, and further clears the temporary setting target logic element data 323 and the temporary setting logic element parameter data 325 memorized in the memory device 32. The control device 2 clears the temporary setting target logic element data 223 and the saved logic element parameter data 224 memorized in the memory device 22.

As above mentioned, according to this embodiment, the control device 2 and the maintenance support device 3 memorize the temporary setting target logic element data 223, 323 in the memory device 22, 32 when the temporary setting of the logic element parameter is performed. Accordingly, it can be shown by the maintenance support device 3 so that the logic element designated as the temporary setting can be visually distinguished from the logic element designated as the formal setting. As a result, it can be easy to distinguish the logic element designated as temporary setting from the logic element designated as formal setting by a test personnel of the parameter tuning.

As the maintenance support device 3 has both the logic element parameter data 322 previously designated as the formal setting and the temporary setting logic element parameter data 325, the logic element parameter data 222 after the temporary setting can be restored even with use of the logic element parameter data 322 and the temporary setting logic element parameter data 325 in case where the logic element parameter data 222 after the temporary setting memorized in the memory device 22 of the control device 2 is lost for some reason.

As above mentioned, a plant monitor and control device 1 relating to this embodiment is equipped with a function, which is easy to use for a test personnel of the parameter tuning. Thus, a work efficiency of the parameter tuning remarkably improves.

What we claimed is:
1. In a plant monitor and control device
connected to a sensor detecting an operational condition of a plant, an actuator controlling the operational condition of the plant, and a monitor and operation device inputting an operational data by an operator, and comprising
a control device having
a memory device memorizing a control logic data representing a contents of a control logic with use of a sensor data inputted by the operator and an operational data inputted from the monitor and operation device, and a logic element parameter data defining a characteristics of logic element included in the control logic data, and an arithmetic processing device performing an arithmetic processing in accordance with the control logic data and outputting the arithmetic processing result as control data to the actuator, and a maintenance support device
connected to the control device and supporting a parameter tuning by temporary setting of a part of data of the logic element parameter data memorized in the memory device of the control device in accordance with data inputted by an operator, the arithmetic processing device of the control device constituted to perform temporary setting of the logic element parameter data, and comprising:

a first processing unit
receiving a temporary setting target logic element data sent from the maintenance support device and designating a target logic element of the temporary setting, a second processing unit
saving the logic element parameter data corresponding to the logic element designated by the temporary setting target logic element data as received among the logic element parameter data memorized in the memory device at a memory area of the memory device different from a memory area memorizing the logic element parameter data, and a third processing unit
receiving the temporary setting logic element parameter data sent from the maintenance support device and corresponding to the logic element designated by the temporary setting target logic element data, and renewing the logic element parameter data corresponding to the logic element designated by the temporary setting target logic element data among the logic element parameter data memorized in the memory device in accordance with the temporary setting logic element parameter data as received, and wherein
the device restores the logic element parameter data before temporary setting in the control device with the saved logic element parameter data memorized in the memory device of the control device according to the need, or the device restores the logic element parameter data after temporary setting in the control device with the temporary setting logic element parameter data memorized in the memory device of the maintenance support device according to the need, and wherein
the maintenance support device with a display device, generates control logic device in accordance with the control logic data and displays the control logic diagram, as generated, in the display device, and displays to distinguish a display of logic element contained in the temporary setting target logic element data among logic elements contained in the control logic diagram as displayed from a display of the other logic elements by applying shading or indicating by a label named tern temporary setting.

2. The plant monitor and control device according to claim 1, wherein the arithmetic processing device of the control device performs in order from the first processing unit to the third processing unit as a start of receiving the temporary setting request data seeking for temporary setting of the logic element parameter data sent from the maintenance support device.

3. The plant monitor and control device according to claim 2 wherein the maintenance support device with a display device, generates a control logic diagram in accordance with the control logic data and displays the control logic diagram, as generated, in the display device, and displays to distinguish a display of logic element contained in the temporary setting target logic element data among logic elements contained in the control logic diagram as displayed from a display of the other logic elements.

4. The plant monitor and control device according to claim 2, wherein the maintenance support device with the memory device memorizes the temporary setting target logic element data memorized in the memory device of the control device, and the temporary setting logic element parameter data memorized corresponding to the logic element designated by the temporary setting target logic element data among the logic element parameter data in the memory device itself as backup data.

5. The plant monitor and control device according to claim 2, wherein the maintenance support device is connected through communication network to one or more control devices.

6. The plant monitor and control device according to claim 1, wherein the maintenance support device with the memory device memorizes the temporary setting target logic element data memorized in the memory device of the control device, and the temporary setting logic element parameter data memorized corresponding to the logic element designated by the temporary setting target logic element data among the logic element parameter data in the memory device itself as backup data.

7. The plant monitor and control device according to claim 6, wherein the maintenance support device is connected through communication network to one or more control devices.

8. The plant monitor and control device according to claim 1, wherein the maintenance support device is connected through communication network to one or more control devices.

9. The plant monitor and control device according to claim 1, wherein the maintenance support device with the memory device memorizes the temporary setting target logic element data memorized in the memory device of the control device, and the temporary setting logic element parameter data memorized corresponding to the logic element designated by the temporary setting target logic element data among the logic element parameter data in the memory device itself as backup data.

10. The plant monitor and control device according to claim 1, wherein
the maintenance support device is connected through communication network to one or more control devices.

11. In a maintenance support method of a plant monitor and control device connected to a sensor detecting an operational condition of a plant, an actuator controlling the operational condition of the plant, and a monitor and operation device inputting an operational data by an operator, and comprising
a control device having
a memory device memorizing a control logic data representing a contents of a control logic with use of a sensor data inputted by the operator and an operational data inputted from the monitor and operation device, and a logic element parameter data defining a characteristics of logic element included in the control logic data, and
an arithmetic processing device performing an arithmetic processing in accordance with the control logic data and outputting the arithmetic processing result as control data to the actuator,
a maintenance support device
connected to the control device and
supporting a parameter tuning by temporary setting of a part of data of the logic element parameter data memorized in the memory device of the control device in accordance with data inputted by an operator,
an arithmetic processing device of the control device performing in order of the following steps comprising
a first step
receiving the temporary setting target logic element data sent from the maintenance support device and designating a target logic element of the temporary setting and memorizing in the memory device,
when the arithmetic processing device receives the temporary setting request data seeking for the temporary setting of the logic element parameter data sent from the maintenance support device,
a second step
saving the logic element parameter data corresponding to the logic element designated by the temporary setting target logic element data as received among the logic element parameter data memorized in the memory device at a memory area of the memory device different from a memory area memorizing the logic element parameter data, and
a third step
receiving the temporary setting logic element parameter data sent from the maintenance support device and corresponding to the logic element designated by the temporary setting target logic element data, and
renewing the logic element parameter data corresponding to the logic element designated by the temporary setting target logic element data among the logic element parameter data memorized in the memory device in accordance with the temporary setting logic element parameter data, and
whereby
the device restores the logic element parameter data before temporary setting in the control device with the saved logic element parameter data memorized in the memory device of the control device according to the need, or
the device restores the logic element parameter data after temporary setting in the control device with the temporary setting logic element parameter data memorized in the memory device of the maintenance support device according to the need, and
wherein
the maintenance support device with a display device
generates a control logic diagram in accordance with the control logic data and displays the control logic diagram, as generated, in the display device, and
displays to distinguish a display of logic element contained in the temporary setting target logic element data among logic elements contained in the control logic display as displayed from a display of the other logic elements by applying shading or indicating by a label named temporary setting.

12. The maintenance support method of the plant monitor and control device according to claim 11,
wherein
the maintenance support device with the memory device
memorizes the temporary setting target logic element data memorized in the memory device of the control device, and the temporary setting logic element parameter data memorized corresponding to the logic element designated by the temporary setting target logic element data among the logic element parameter data in the memory device as backup data.

13. The maintenance support method of the plant monitor and control device according to claim 12,
wherein
the maintenance support device is connected through communication network to one or more control devices.

14. The maintenance support method of the plant monitor and control device according to claim 11,
wherein
the maintenance support device is connected through communication network to one or more control devices.

15. The maintenance support method of the plant monitor and control device according to claim 11,
wherein
the maintenance support device with the memory device
memorizes the temporary setting target logic element data memorized in the memory device of the control device, and the temporary setting logic element parameter data memorized corresponding to the logic element designated by the temporary setting target logic element data among the logic element parameter data in the memory device as backup data.

16. The maintenance support method of the plant monitor and control device according to claim 11,
wherein
the maintenance support device is connected through communication network to one or more control devices.

* * * * *